United States Patent
Meurer et al.

(10) Patent No.: US 6,426,009 B1
(45) Date of Patent: Jul. 30, 2002

(54) TRAVELLING SCREEN WITH TRAVEL PAUSE FOR IMPROVED CLEANING OF SCREEN AND METHOD OF IMPLEMENTING SAME

(75) Inventors: Charles Lonnie Meurer; Joseph Karl Brauch, both of Golden, CO (US)

(73) Assignee: Meurer Industries, Inc., Golden, CO (US)

( * ) Notice: Subject to any disclaimer, the term of this patent is extended or adjusted under 35 U.S.C. 154(b) by 0 days.

(21) Appl. No.: 09/415,454

(22) Filed: Oct. 8, 1999

(51) Int. Cl.⁷ ............................................... B01D 29/09
(52) U.S. Cl. ........................ 210/747; 210/783; 210/791; 210/158; 210/160; 210/391
(58) Field of Search ................................. 210/158, 160, 210/400, 391, 783, 791, 747

(56) References Cited

U.S. PATENT DOCUMENTS

| | | | |
|---|---|---|---|
| 658,196 A | 9/1900 | Whitney | |
| 677,567 A | 7/1901 | Freeman et al. | |
| 1,194,250 A | 8/1916 | Smits | |
| 1,207,376 A | 12/1916 | Davidson | |
| 1,864,359 A | 6/1932 | Laughlin et al. | |
| 2,095,504 A | 10/1937 | Kesti et al. | 210/176 |
| 2,466,240 A | 4/1949 | Joa | 198/189 |
| 2,634,863 A | 4/1953 | Hauer | 210/176 |
| 2,885,080 A | 5/1959 | Goldman | 210/160 |
| 3,225,928 A | 12/1965 | Black | 210/121 |
| 3,856,678 A | 12/1974 | Hagihara | 210/160 |
| 4,188,294 A | 2/1980 | Higihara | |
| 4,220,540 A | 9/1980 | Hagihara | |
| 4,323,451 A | 4/1982 | Hagihara | |
| 4,379,056 A | 4/1983 | Hagihara | |
| 4,447,324 A | 5/1984 | Jackson | |
| 4,472,273 A | 9/1984 | Hagihara | |
| 4,518,494 A | 5/1985 | Jackson | |
| 4,692,242 A * | 9/1987 | Jackson | 210/160 |
| 4,853,116 A * | 8/1989 | Wallander | 210/158 |
| 5,059,313 A | 10/1991 | Etschel et al. | |
| 5,387,336 A | 2/1995 | Bormet et al. | |
| 5,800,701 A * | 9/1998 | Larsen | 210/791 |
| 5,993,651 A * | 11/1999 | Wiesemann | 210/160 |

FOREIGN PATENT DOCUMENTS

DE 865726 6/1952

* cited by examiner

Primary Examiner—Christopher Upton
(74) Attorney, Agent, or Firm—C. E. Martine, Jr.

(57) ABSTRACT

A travelling screen and screening method minimize reintroducing debris to liquid downstream of a screen while achieving the relatively high efficiency of fixed bar screens. A filter surface is defined by a pair of planar plates, each of the plates having openings through which the liquid but not the debris may flow. A connector between the plates positions the plates relative to each other at a selected fixed angle. The connector formed integrally with each of the plates has the planar plates and the connector formed from one sheet and the connector in the form of a bend. A guide mounts a first travelling screen element adjacent to a second such element at a screen element scraper path with one planar plate of the first screen element being oriented relative to one planar plate of the second screen element to define a linear scraper path. The guide also positions the first and second screen elements adjacent to each other along a debris separation path. One planar plate of each of the first and second screen elements is oriented generally horizontally to define a series of generally horizontal steps for debris collection. The guide positions the first and second screen elements with the respective planar plates extending out of and on one side of the debris separation path. A method positions the travelling screen elements for being scraped. A first screen element leads a second trailing screen element along the debris separation path, and one planar plate of the leading screen element and one planar plate of a trailing screen element are scraped at one time when the motion of the screen elements pauses.

10 Claims, 17 Drawing Sheets

TRAVELLING SCREEN WITH TRAVEL PAUSE FOR IMPROVED CLEANING OF SCREEN AND METHOD OF IMPLEMENTING SAME

BACKGROUND OF THE INVENTION

1. Field of the Invention

The present invention relates generally to removing debris from waste flowing in a channel to a waste treatment facility, and more particularly to methods and apparatus for causing a large area travelling screen to pause and provide improved cleaning of the screen.

2. Description of the Related Art

Basins are used to remove certain undesired solid materials from liquid, for example, to clarify the liquid. For example, basins are used in water and waste water treatment plants, and in industrial waste water plants. Undesirable solid materials include non-settleable colloidal solid material that is mixed with chemicals to agglomerate and form solid materials that will settle from the liquid. In water and waste water treatment plants, undesirable solid materials include organic solids. In industrial processes, undesirable materials may include a variety of materials, such as fibers, which are not amenable to agglomeration and settling, for example.

Water, waste water, and liquid industrial wastes are treated in basins to remove such undesirable solid materials. The word "liquid" as used herein to describe the present invention refers to water, waste water, and liquid industrial wastes. These undesirable solid materials include particles that are suspended in the liquid. Some particles are removed from liquid by settling in low flow rate settlers, for example. Many undesirable solid materials are not removable by settling. For example, these include: (1) man-made materials such as plastics; (2) construction debris, containers and other large items that may be carried by the liquid but are not suspended in the liquid; and (3) many other materials (e.g., paper towels) that are carried by the liquid but do not degrade in the manner in which biodegradable materials (e.g., food) degrade.

For purposes of differentiating the undesirable, suspended solid materials from such other undesirable, non-settleable larger materials, these undesirable, suspended, settleable materials are referred to herein as "solids" or "settleable solids", whereas these undesirable, non-settleable larger materials are referred to herein as "screenable solid materials", or "debris", because the debris are preferrably removed in "screening" equipment which permits the liquid and the settleable solids to flow past such equipment into the basin for settling of the settleable solids. Examples of such debris may include plastic products, paper, and dental floss.

If such debris are not removed before flowing into the basin, the debris may interfere with settling, debris in sludge from the settler may interfere with the removal of the sludge from the basin, and the sludge recovered from the basin may include some of the debris. The debris in the sludge is not desirable as it reduces the value of the sludge, and lessens the rate of settleable solids removed by settling per gallon of liquid.

Efforts have been made to improve ways of removing debris from liquids by screening. The removed debris may be referred to as "screenings", for example. Fixed bar screens have worked effectively to remove debris in applications in which a channel for guiding a flow of the liquid and debris is not buried tens of feet under ground. For example, a prior art fixed bar screen offered for sale by Meurer Industries, Inc. has a front rake capable of cleaning the bar screen in a superior manner.

When the channel is buried tens of feet under ground, for example, too much time may be taken in moving the removed screenings up from the channel to the level of the floor of the treatment plant. Also, in many cases the stroke of a rake along the bars of the bar screen is too slow, and the extension of the rake arm down to the channel results in the rake arm extending many feet above the plant floor when the rake carries the removed debris up to the level of the floor. Therefore, although the efficiency of the basic screening operation of a bar screen may be acceptable, in certain applications the overall efficiency of bar screening is lacking as too slow or requiring too much height above the plant floor.

Others have attempted to improve screening by the use of so-called travelling screens. In these screens, an endless mesh screen is continuously moved into the liquid and the debris to gather the debris from the channel. As such screen continuously moves, the screen advances out of the liquid. In one type of travelling screen an endless screen continues to move out of the liquid and continue to move past a debris removal station at which the collected debris is brushed off such screen. See U.S. Pat. No. 5,387,336, for example. Alternatively, the collected debris may be removed from the screen by air or liquid, for example.

In one type of typical tooth-type travelling screen, the teeth are pivotally mounted and engage cams as the teeth continuously move. The cams cause one tooth to pivot and scrape against adjacent teeth in an attempt to remove the debris from the teeth. See U.S. Pat. No. 4,188,294, for example.

However, such blowing, brushing, teeth scraping, and other current attempts to remove the debris from the continuously moving travelling screens are not efficient enough. Thus, significant amounts of the debris stay on the travelling screen and move back into the channel. Unfortunately, the return path of such travelling screens is downstream of an upstream path that the liquid and the debris engage for removal of the debris. The debris is washed off this downstream path back into the liquid, which greatly lessens the efficiency of the travelling screen.

Further, even when the channel is near the ground, the area of a fixed bar screen through which the liquid flows is generally limited to the cross-sectional area of the channel, e.g., the channel width by the depth of the liquid and debris in the channel. Attempts to provide more screen area include providing a semicircular shape for each of a series of screen elements of a travelling screen. However, it is difficult to properly physically remove the debris from such semicircular screens, and the same problem of reintroducing the debris to the liquid downstream of the screen exists.

In view of the forgoing, what is needed is a way to efficiently remove the debris from a travelling screen so as to minimize the problem of reintroducing the debris to the liquid downstream of the screen. Further, the relatively high efficiency of fixed bar screens should be achieved while minimizing that problem.

SUMMARY OF THE INVENTION

Broadly speaking, the present invention fills these needs by more efficiently removing debris from a travelling screen so as to minimize the problem of reintroducing the debris to the liquid downstream of the screen. Further, while minimizing the problem the relatively high efficiency of fixed bar screens is achieved.

The present invention fills these needs by providing improved travelling screen elements for separating debris from liquid. Each of the screen elements has a filter surface through which the liquid but not the debris may flow. The filter surface is defined by a pair of planar plates, each of the plates having openings through which the liquid but not the debris may flow. A connector between the plates positions the plates relative to each other at a selected fixed angle. In one embodiment of the present invention, the selected fixed angle may be about ninety degrees. In this embodiment, the connector may be formed integrally with each of the plates. The integral version may be defined when the planar plates and the connector are formed from one sheet, and the connector is in the form of a bend to define the fixed angle and the two plates.

Provisions may also be made to mount one travelling screen element adjacent to another such element, and to move the adjacent elements into and out of the liquid and the debris in the channel. Each of the screen elements may have an angular cross section. One positioning of the series of elements is with some of the elements in the channel and relative to each other so that the angular cross sections cooperate to define a series of stairs for collecting debris from the channel. Another positioning of the series of elements is with some of the elements out of the channel and relative to each other so that the angular cross sections cooperate to change the stairs to define a substantially planar surface to facilitate removal of the collected debris from the elements.

The present invention also achieves these results by providing a travelling screen element assembly for receiving debris separated from liquid and transferring the travelling screen element assembly with the debris to a scraper. The assembly may include first and second screen elements. The first screen element has a filter surface defined by a first pair of planar plates, each of the plates of the first pair having openings through which the liquid but not the debris may flow. The first screen element also has a first connector between the plates of the first pair for positioning the plates of the first pair relative to each other at the selected fixed angle. The assembly may also have a second screen element having a filter surface defined by a second pair of planar plates, each of the plates of the second pair having openings through which the liquid but not the debris may flow. The second screen element may also have a second connector between the plates of the second pair for positioning the plates of the second pair relative to each other at the selected fixed angle. In the assembly, a guide positions the first and second screen elements adjacent to each other along a screen element scraper path with one planar plate of the first screen element being oriented relative to one planar plate of the second screen element so as to define a linear scraping path to facilitate removal of the debris from the screen elements by a scraper. In one embodiment of this assembly, the guide positions the first and second screen elements so that the linear scraping path has a first linear section defined by the one planar plate of the first screen element and a second linear section defined by the one planar plate of the second screen element. The guide positions the first linear section and the second linear section relative to each other at an angle of from about 175 degrees to about 195 degrees. In another embodiment of this assembly, the guide most preferrably positions the first linear section and the second linear section relative to each other at an angle of about 180 degrees so that the first linear section and the second linear section are aligned to define the linear scraping path as one plane, i.e., flat.

The present invention further achieves these results by having the guide position the first and second screen elements adjacent to each other along a debris collection path. The guide positions the first and second screen elements with one planar plate of each of the first and second screen elements oriented generally horizontally. As a result, these planar plates of the adjacent first and second screen elements define a series of generally horizontal steps for debris collection as the liquid and the debris flow toward the planar plates.

The present invention further achieves these results by having the guide position the first screen element and the second screen element with the respective planar plates extending out of and on one side of the debris separation path.

The present invention may further achieve these results by a method of positioning travelling screen elements for separating debris from the screen elements after the debris has been received on the screen elements within a flow channel. One operation of the method provides first and second screen elements according to the above description. Another operation mounts the first and second screen elements adjacent to each other along a debris separation path that is out of the channel so that the first screen element leads the second screen element along the path. One planar plate of the leading screen element is defined as a leading plate and the other planar plate of the leading element is defined as a trailing plate. One planar plate of the trailing screen element is defined as a leading plate and the other planar plate of the trailing element is defined as a trailing plate. With the first and second screen elements adjacent to each other along the debris separation path out of the channel, a final operation may be scraping the leading plate of the trailing element and the trailing plate of the leading element to separate the debris from these scraped plates of the screen elements. This scraping motion may be continuous, and the respective leading and trailing screen elements may be stopped during the scraping.

The present invention may further achieve these results by a method in which an operation provides a third screen element that is similar to the first and second elements. The first and second screen elements are moved to position the third screen element as a second trailing element that trails the first-recited trailing screen element. With the second and third screen elements adjacent to each other along the debris separation path, and out of the channel, and paused at a debris removal station, another operation scrapes the leading plate of the second trailing element and the trailing plate of the first trailing element to remove the debris from the leading plate of the second trailing element and the trailing plate of the first trailing element.

The present invention may additionally achieve these results by providing the above-described screen elements in a travelling screen for removing debris from liquid and debris flowing in a channel. In this travelling screen, there is an endless arrangement of such separate screen elements, each of the screen elements having two planar sections positioned relative to each other at the selected angle, e.g., at an angle about ninety degrees. A support is provided for the endless arrangement, the support positioning adjacent ones of the screen elements at a debris removal, or cleaning, station with the adjacent ones of the sections defining a planar surface. In this embodiment, each planar section of each element may be provided with perforations to allow the liquid to flow through the element while blocking the debris. The channel may have a cross section with a given area perpendicular to direction of the flow. The support may include spaced guides having a given width and spaced links located in the guides. The screen elements may extend between the guides to define a screen element width, the planar sections each having a substantially straight screen element length substantially greater than the first dimension. In implementing this embodiment, the spaced guides may be positioned in the channel at an angle relative to the direction of the flow through the channel.

The present invention may further achieve these results by a method in which debris is separated from liquid flowing in a channel. Operations of the method may include providing a series of the separate screen elements. The pairs of the screen elements are positioned adjacent to each other. A series of the elements is mounted with some of the elements in the channel and some of the elements out of the channel. The debris is collected on the screen elements that are in the channel. The screen elements are moved out of the channel to carry the collected debris out of the channel. The moving operation pauses with one pair of the adjacent elements positioned at the debris removal station. The paused pair defines a planar debris collection surface carrying the collected debris. In one embodiment, the planar debris collection surface is one planar section. In another embodiment, the planar debris collection surface is formed from two planar sections. A variation is that the two planar sections define two planes positioned at an obtuse angle that may be a peak or a depression. With the planar debris collection surface defined and carrying the collected debris, and the moving operation paused with one pair of the adjacent elements positioned at the debris removal station, a next operation is moving a scraper from a start position along the planar debris collection surface to scrape the debris off that planar surface. Once the scraping is complete, the series of elements is moved so that the previously-last screen element of the first pair and the first screen element of the next pair of screen elements define a next planar surface. This moving of the series of elements occurs while the scraper is moved to the start position.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

DETAILED DESCRIPTION OF THE PREFERRED EMBODIMENTS

An invention is described for more efficiently removing debris from a travelling screen so as to minimize the problem of reintroducing the debris to the liquid downstream of the screen. The invention is described in terms of a travelling screen that is intermittently advanced to present a new screen surface to a scraper for cleaning while the scraper is continuously moved into position for scraping and then for scraping. It will be obvious to one skilled in the art that the present invention may be practiced without some or all of these specific details. In other instances well-known process operations or apparatus have not been described in detail in order not to obscure the present invention.

Figure 1:
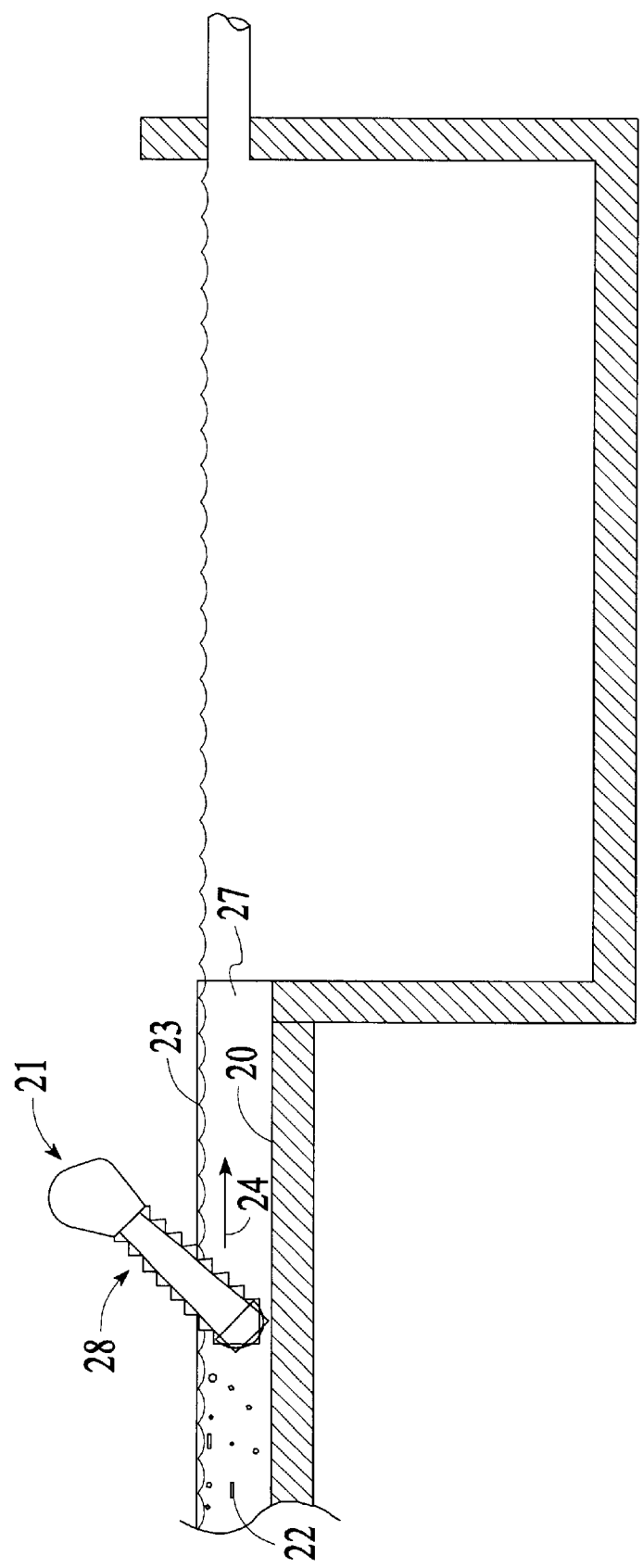
FIG. 1 is a side elevational view of a flow channel provided with a travelling screen according to the present invention, illustrating debris removed from liquid flowing in the channel, wherein the liquid without the debris flows into a clarifier basin.

FIG. 1 shows a flow channel 20 provided with a travelling screen 21 according to the present invention, illustrating debris 22 removed from liquid 23 flowing (arrow 24) in the channel 20. The liquid 23 without the debris 22 flows into a clarifier basin 26 for removal of solids 27 suspended in the liquid 23.

Figure 2A:
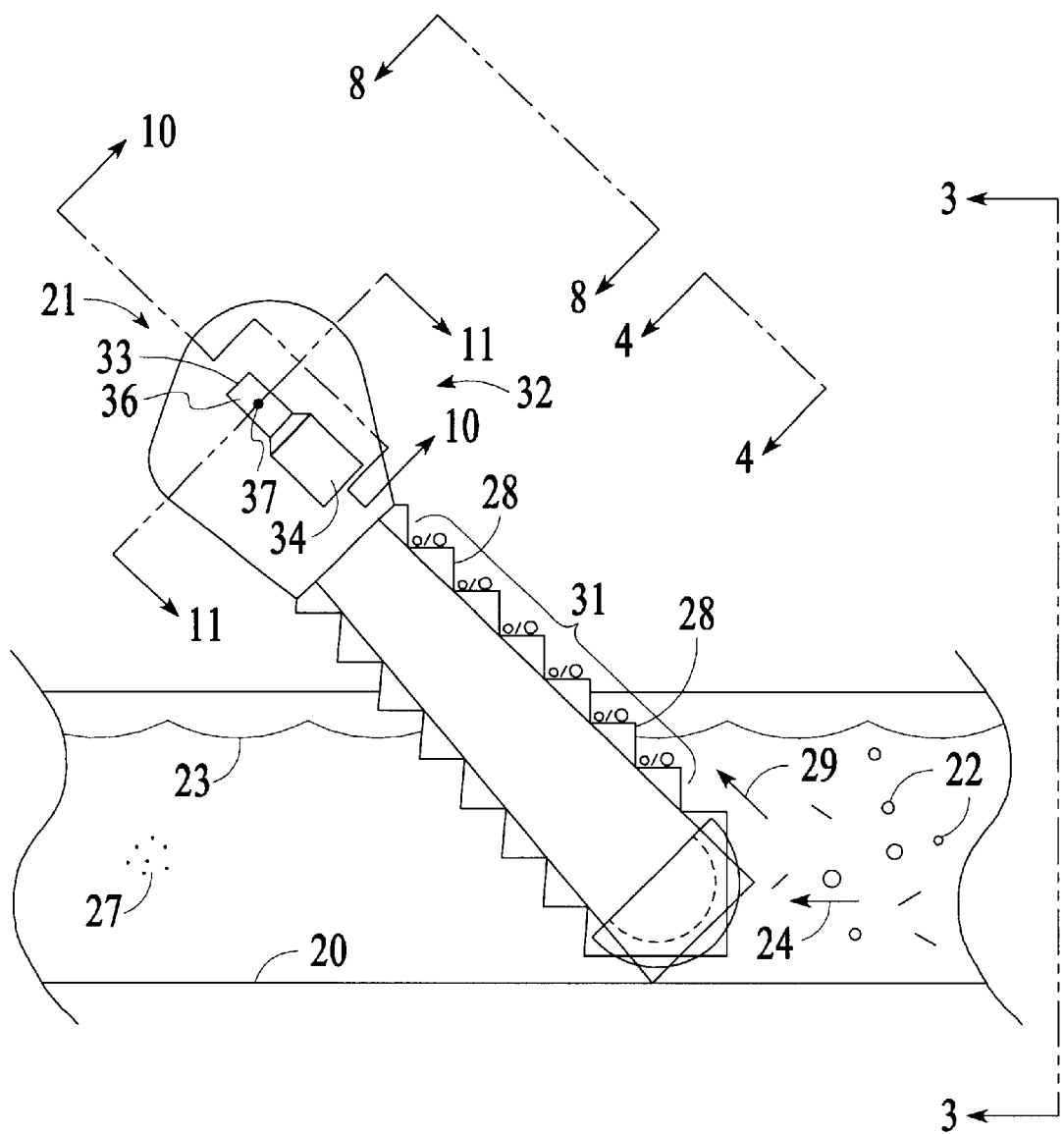
FIG. 2A is a side elevational view of the travelling screen shown in FIG. 1, illustrating screen elements defining stairs for collecting the debris and a main drive on one side of the screen.

FIG. 2A shows one side of the travelling screen 21 as including screen elements 28 arranged in the channel 20 along an upwardly extending debris collection subpath 29 for removal of the debris 22 from the liquid 23 before the liquid 23 flows (arrow 24) to the basin 24. The screen elements 28 in the subpath 29 are stair-like in that they define an intermittently moving set of stairs 31. Each step 31 is shown extending generally horizontal. The screen elements 28 of the steps 31 are oriented relative to each other and to the direction of the flow of the liquid 23 so as to carry the debris 22 that is held against each screen element 28. The screen elements 28 carry the debris 22 upwardly along the debris collection subpath 29, and out of the channel 20, to the debris removal station 32. Thus, the removal of the debris 22 is by collecting the debris 22 on the stairs 31 in the channel 20 and moving the stairs 31 out of the channel 20 to the debris removal station 32. A main drive 33 for the travelling screen 21 may include a motor 34 and a gear box 36 for rotating a main drive shaft 37

Figure 2B:
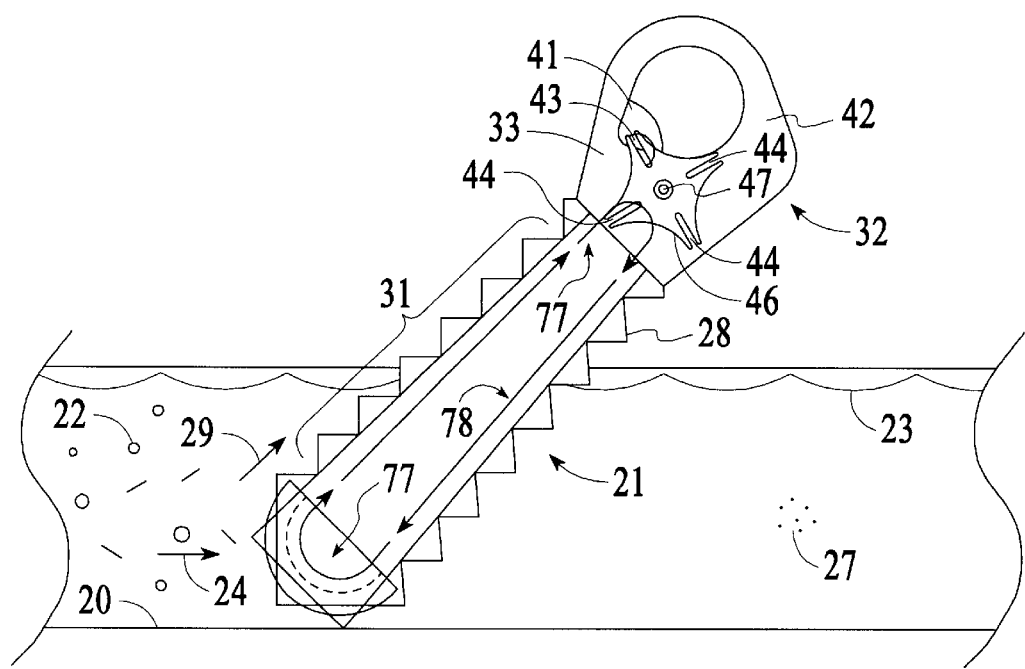
FIG. 2B is a side elevational view of the travelling screen shown in FIG. 2A, illustrating an opposite side of the screen having an intermittent drive driven by the main drive, the intermittent drive periodically advancing the screen elements.

FIG. 2B shows the other side of the travelling screen, illustrating a wheel 41 of an intermittent drive 42. The wheel 41 is driven by the main drive shaft 37 and has a drive pin 43 that is continuously moved in a circular path (not shown) to intermittently (four times per one rotation of the wheel) engage slots 44 provided in a Geneva wheel 46. The Geneva wheel 46 is indexed 90 degrees each time the pin 43 engages one of the slots 44, and in turn rotates an intermittent drive shaft 47 indexed 90 degrees each time the pin 43 engages one of the slots 44.

Figure 3:
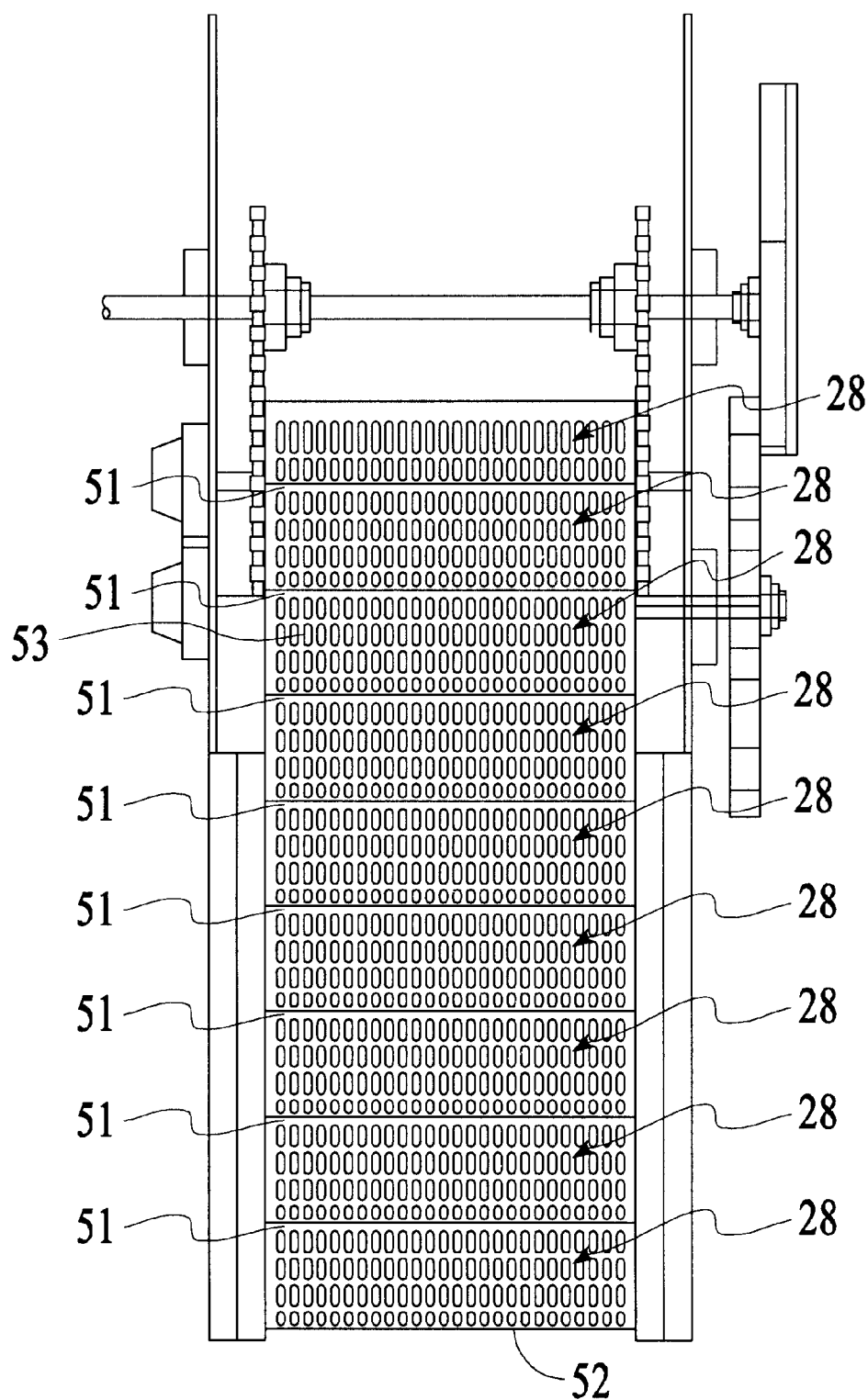
FIG. 3 is a side elevational view taken along line 3—3 in FIG. 2A showing the screen elements arranged adjacent to each other and in series to collect the debris.
Figure 5:
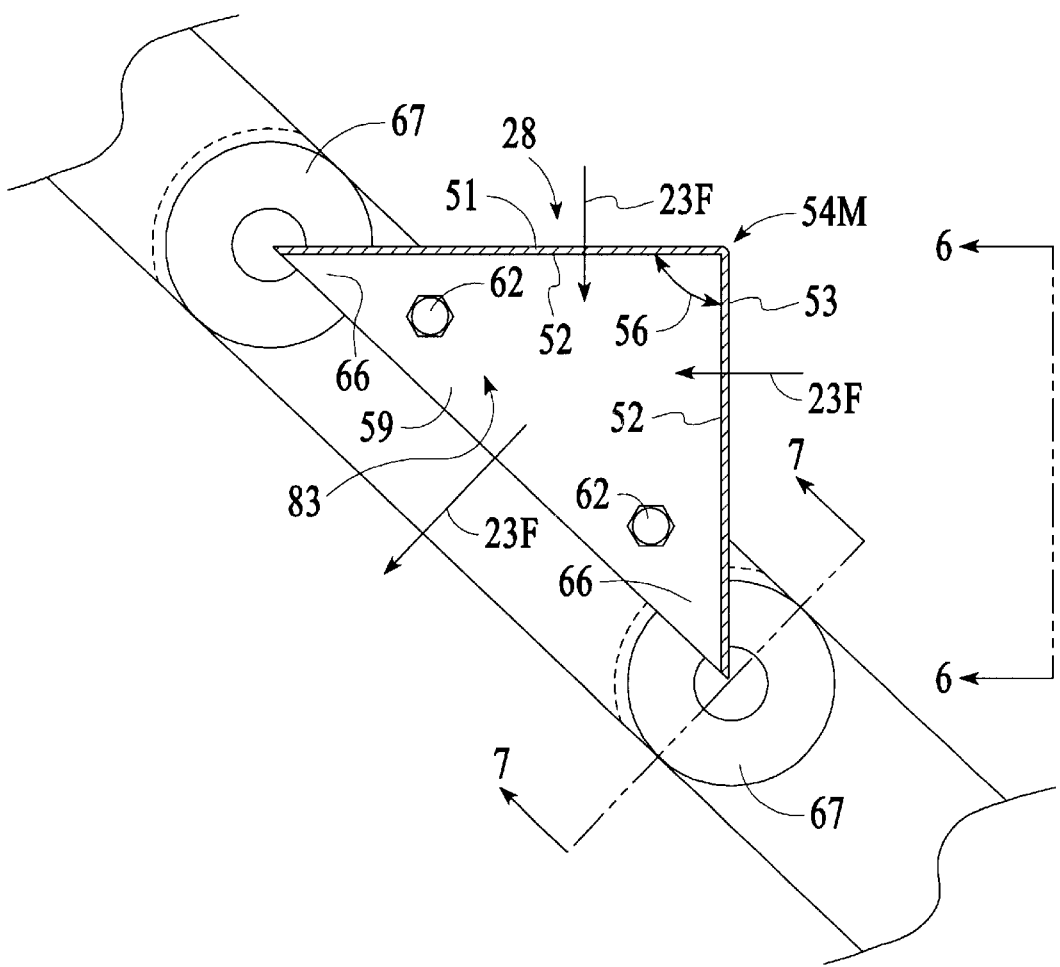
FIG. 5 is a cross sectional view taken along line 5—5 in FIG. 4 showing one of the screen elements supported by one of the links, where the element has a right angular shape.
Figure 6:
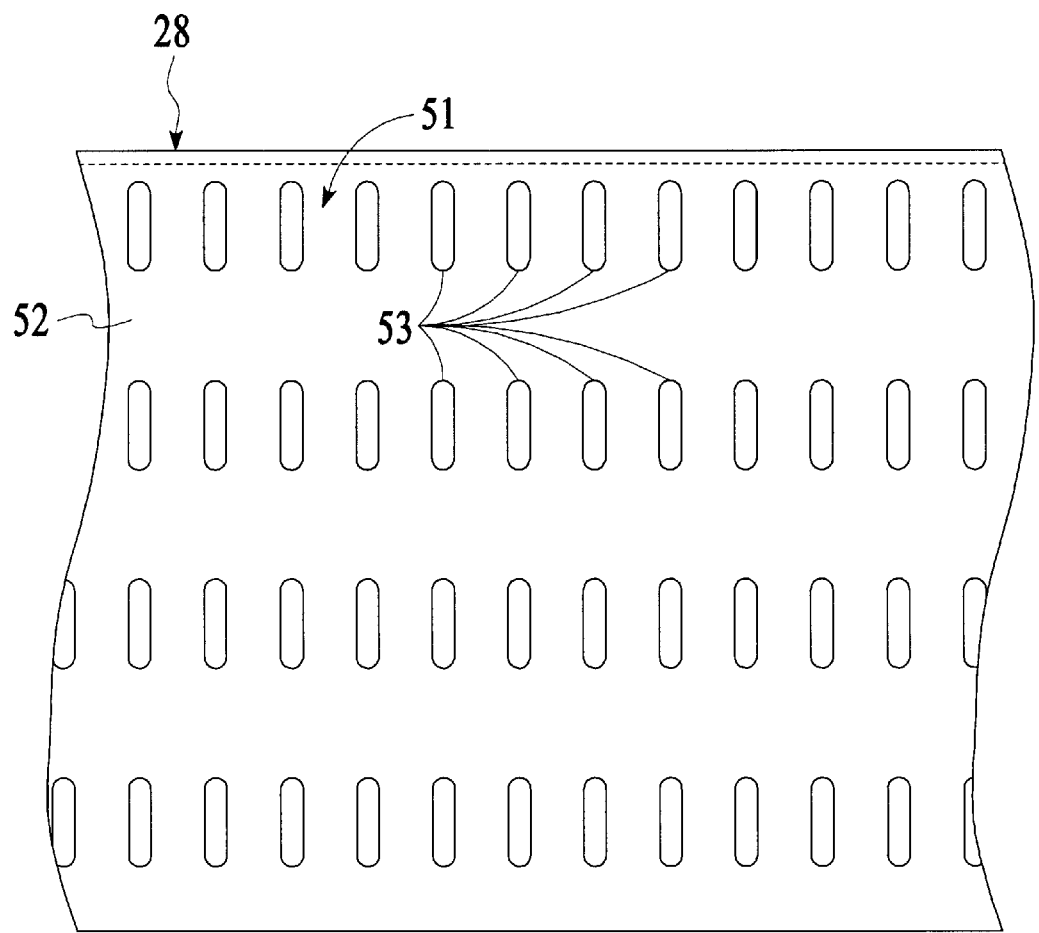
FIG. 6 is an elevational view taken along line 6—6 in FIG. 5 showing one portion of the screen element having a mesh structure for allowing liquid but not debris to flow through the element.

FIG. 3 shows the screen elements 28 arranged adjacent to each other and in series in the subpath 29 positioned to collect the debris 22. Each screen element 28 has a filter surface 51. FIG. 5 shows the filter surface 51 of one of the screen elements 28 defined by a pair of planar plates 52, each of the plates 52 having openings 53 through which the liquid 23 but not the debris 22 may flow. FIG. 6 shows the openings 53 as perforations, which may be holes extending through each of the plates 52. The openings 53 may be made by punching through the plates 52, for example. The openings 53 may be elongated and narrow, having dimensions in the range of about 0.125 inches to 0.25 inches wide by from about one inch to 1.5 inches long. The openings 52 will allow liquid 23 such as water, to flow through the plates 52, but will block the flow of the debris 22.

Figure 4:
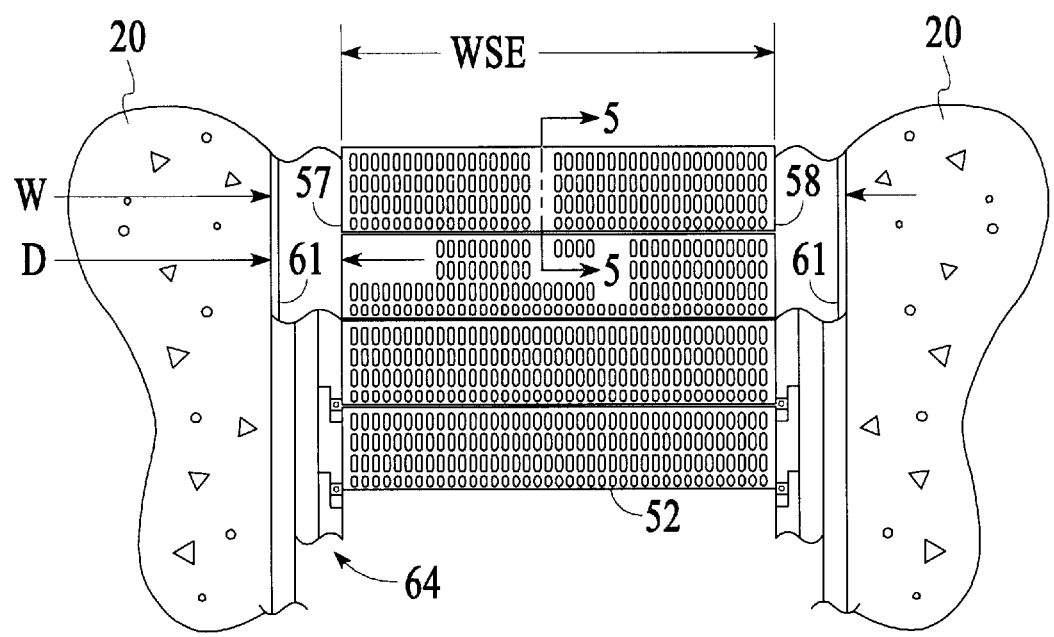
FIG. 4 is a side elevational view taken along line 4—4 in FIG. 2A showing the screen elements supported by links of an endless chain driven by the intermittent drive.

A connector 54 is shown in FIG. 5 between the plates 52 for positioning the plates 52 relative to each other at a selected fixed angle 56. The selected fixed angle 56 may preferably be about ninety degrees. The connector 54 may be provided by bending one sheet of plate material (stainless steel or molded plastic, such as urethane or ABS, for example) to define the two plates 52. The apex of the bent sheet is said to be the connector 54 in this example. FIG. 4 shows that each of the planar plates 52 has a first end 57 and an opposite second end 58. A triangular member 59 shown in FIG. 5 is secured to each of the ends 57 and 58 to hold the plates 52 at the desired angle 56. The member 59 is shown as an equilateral triangle having a main apex 54M adjacent to the connector 54, and an acute apex 54A at each of the other corners of the member 59. Each acute apex 54A is at an acute angle with respect to the adjacent plate 52 and edge of the member 59.

FIG. 4 shows the screen element 28 extending across substantially all of a width W of the channel 20. Each of the planar plates 52 has a width WSE about equal to the width W of the channel 20 so that the triangular members 59 secured to the first end 57 and to the second end 58 are also spaced by the width WSE. FIG. 4 shows that each of the ends 57 and 58 of the screen element 28 is spaced from the walls 61 of the channel 20 by a distance D. A flap (not shown) seals the walls 61 to the screen elements 28 so that no liquid 23 or debris 22 flows around the screen elements 28.

Figure 7:
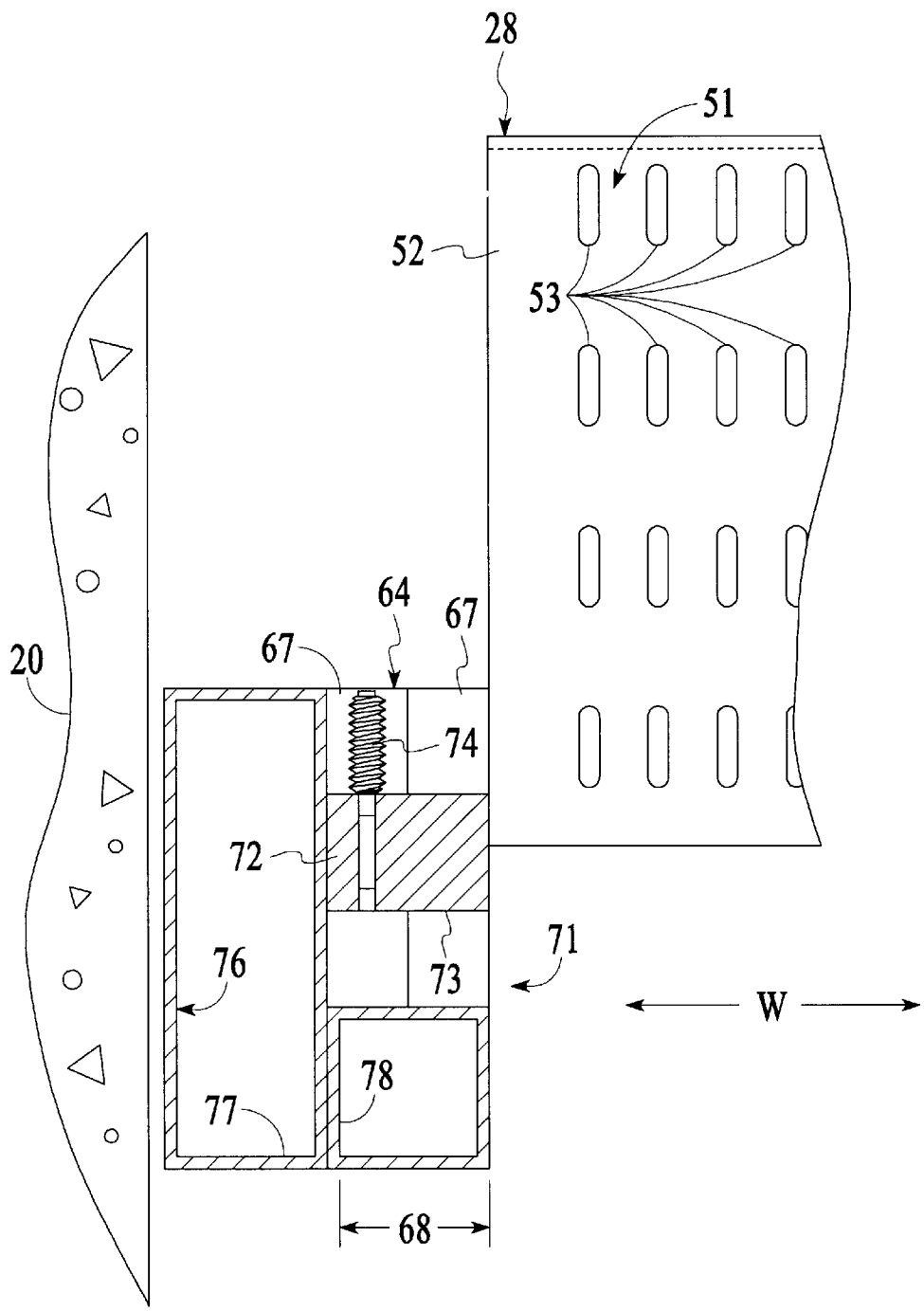
FIG. 7 is a cross sectional view taken along line 7—7 in FIG. 5 showing a shaft extending through the links to allow the links to pivot relative to one another.

FIG. 5 shows that each of the triangular members 59 is secured by bolts 62 to a link 63 of an endless chain 64. Each link 63 may be made from material that resists degradation in the liquid 23, such as UHMW polyethylene. Each link 63 is connected to one of the triangular members 59 and extends past each acute apex 66 to a link end 67. Another link 63 is connected to each of the link ends 67, and this series of connections is repeated to define the entire endless chain 64. FIG. 7 shows that each link 63 normally has a width 68 in the direction of the width W of the channel. To facilitate connecting one link 63 to the next link 63 of the endless chain 64, each link end 67 is cut away and has a narrower width 71 than the width 68 of the main body of the link 63 that is secured to the triangular member 59. A chain-connecting pin or shaft 72 extends through holes 73 provided in the link ends 67 to join the links 63. The cut away link ends 67 may overlap and be held in overlapping relationship by the pin 72 and a set screw 74 that extends through one of the link ends 67 into the pin 72. In this manner a series of the links 63 may be connected to each other as shown in FIG. 5 to define the endless chain 64. Although not shown in FIG. 5, each such link 63 carries one of the screen elements 28 in the orientation shown in FIG. 5. The respective links 63 carry the screen elements 28 in side-by-side relationship as shown in FIGS. 2A and 4 with almost no space between the adjacent screen elements 28. In this manner, the liquid 23 is caused to flow through the openings 53 and not around any of the screen elements 28.

FIG. 7 also shows the link ends 67 engaged with an L-shaped guide 76 that is secured to the walls 61 of the channel 20. FIG. 2B shows the guide 76 extends in an endless path 77 (FIG. 2A) that includes the debris collection path 29. The endless path 77 extends from the path 29 out of the liquid 23 to and past the debris removal station 32 and returns in a downward leg 78 to the debris collection subpath 29. The guide 76 may be made from a first tube 77 secured to a second tube 78. The guide 76 thus has an L-shape in cross section to provide lateral and vertical support of the links 63 that form the endless chain 64. The links 63 ride on and within the guides 76 and along the endless path 77 to perform the functions described herein.

Figure 13A:
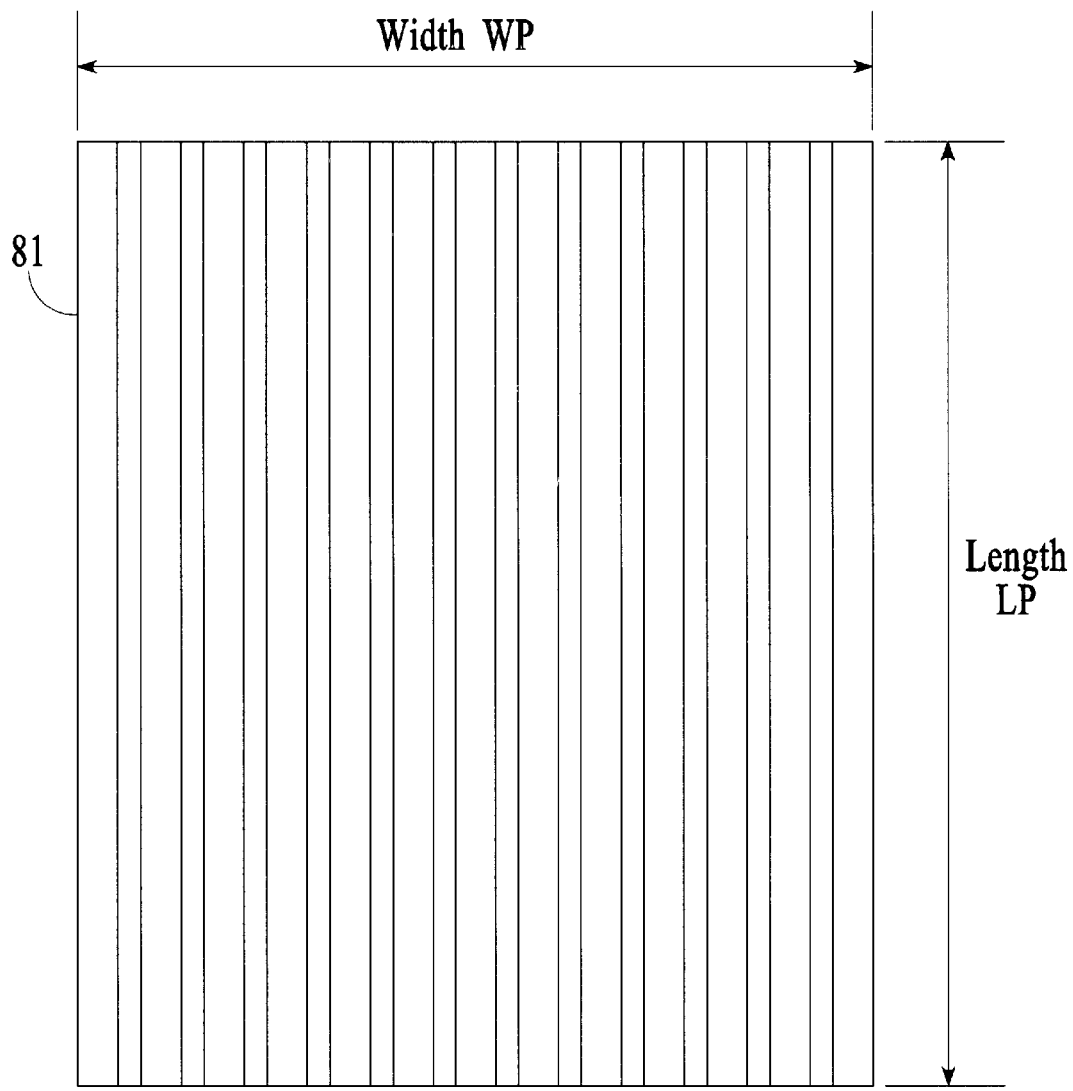
FIG. 13A is an elevational view of a prior art bar screen showing how the area of the screen is measured.
Figure 13B:
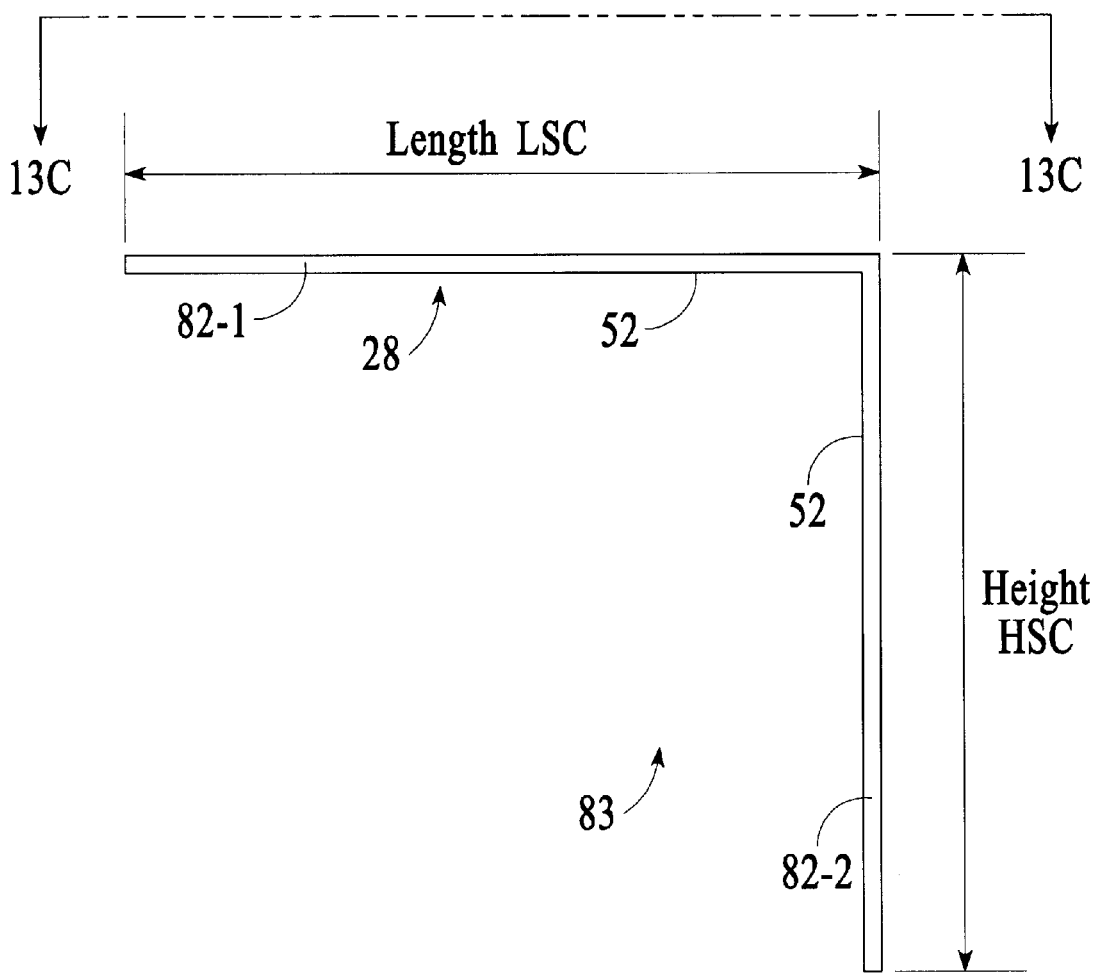
FIG. 13B is a cross sectional view of one screen element showing how the length and height of the screen are measured.
Figure 13C:
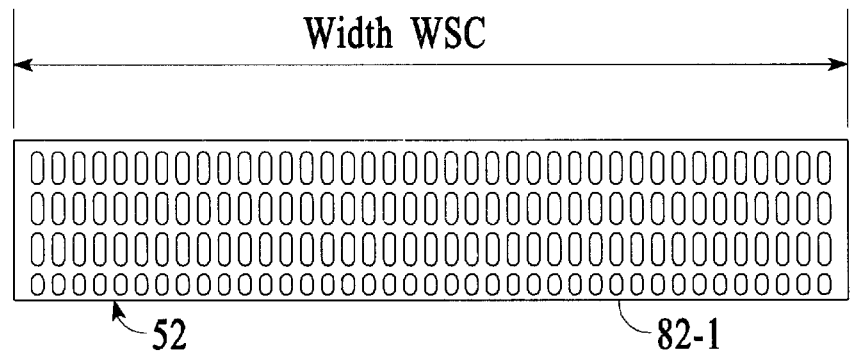
FIG. 13C is a plan view of the screen element shown in FIG. 13B illustrating the width of the screen.

As described, the two plates 52 of each screen element 28 are positioned at the angle 56 such that the plates 52 do not extend directly from one pin 72 to a next adjacent pin 72 in a "flat" manner between such pins 72. A prior art bar screen 81 (FIG. 13A) would so extend in a flat manner and would have a filter area equal to the length LP times the width WP. In comparison, the plates 52 define a substantially greater screening area. In particular, the plates 52 define respective first and second planar screening sides 82-1 and 82-2 of the screen elements 28, and have a screening area calculated by a height HSC times a length LSC (FIG. 13B) times a width WSC. Since the length LSC plus the height HSC are much greater than the length LP of the bar screen 81, for example, the screening area of each of the screen elements 28 substantially exceeds the screening area of the bar screen 81.

With the greater screening area, the screen elements 52 also have a first aggregate liquid entrance area LEA defined by the aggregate area of the openings 53 in the first and second planar sides 82-1 and 82-2. The planar sides 82-1 and 82-2 at the angle 56 further define a screened liquid outlet 83 through which the screened liquid 23F flows (FIG. 5). The outlet 83 extends across and opposite to the first and second planar sides 82-1 and 82-2. The outlets 83 have a liquid exit flow area equal to the distance between the pins 72 times the width WSE of the screen elements 28. The exit flow area is about the same as the liquid entrance area LEA.

Figure 8:
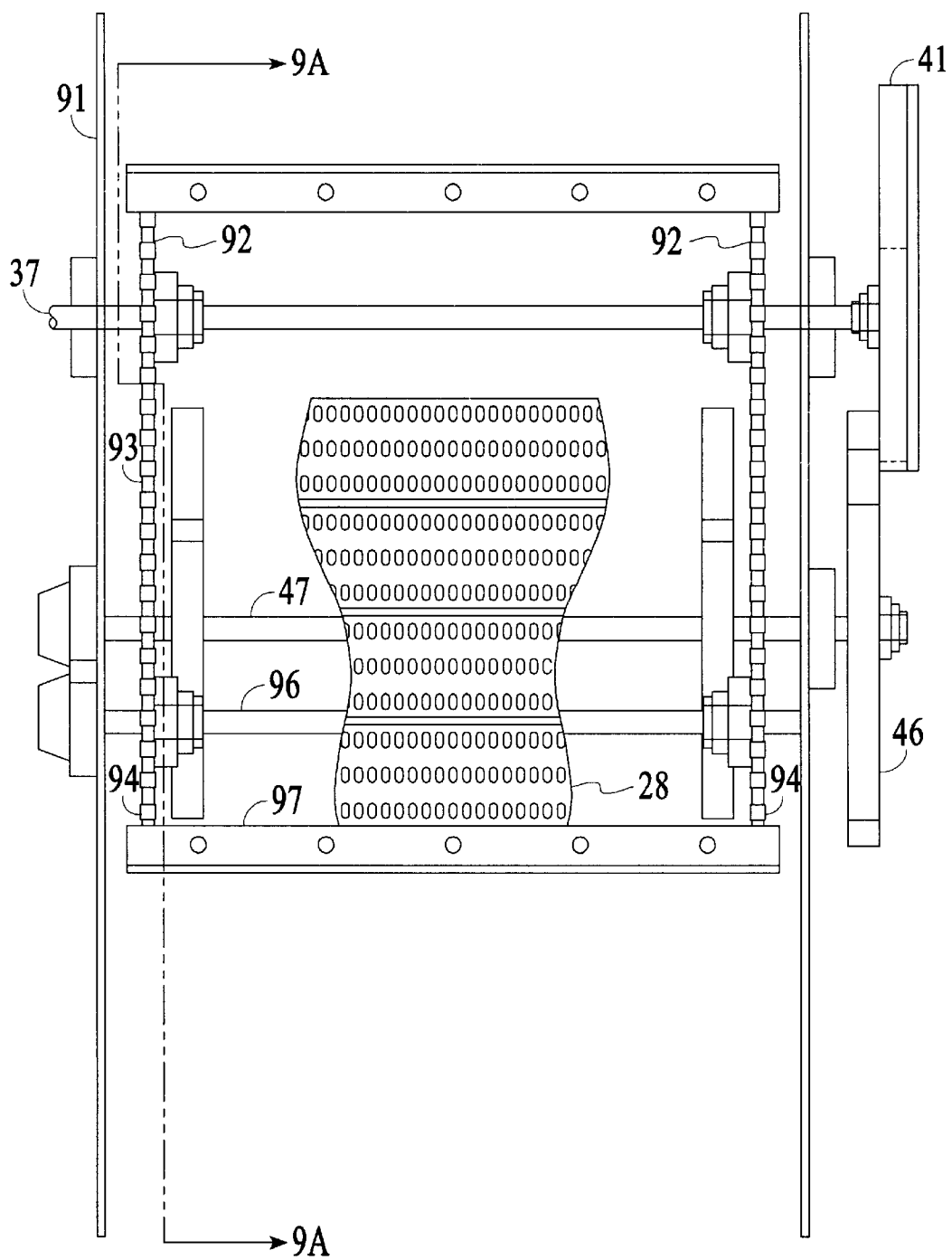
FIG. 8 is a side elevational view taken along line 8—8 in FIG. 2A showing the main drive continuously rotating drive shafts for a screen element scraper and driving the intermittent drive.

Reference is now made to FIGS. 2A and 2B in conjunction with FIGS. 8–12 for a description of the manner in which the travelling screen 21 is advanced in the channel 20 along the upwardly extending debris collection subpath 29, and in which the screen 21 is moved out of the channel 20 to the debris removal station 32 located above the channel 20, and in which scrapers 97 operates at the debris removal station 32 to remove the debris 22 from the screen elements 28, and in which the cleaned screen elements 82-1 and 82-2 are returned to the debris collection subpath 29. As described above with respect to FIGS. 2A and 2B, the main drive 33 for the travelling screen 21 may include the motor 34 and the gear box 36 for continuously rotating the main drive shaft 37 FIGS. 8 and 9A show the main drive shaft 37 extending from a power input side 91 across the width WSC to the wheel 41. Between the wheel 41 and the side 91 the main shaft 37 rotates separate drive sprockets 92. The drive sprockets 92 drive respective chains 93 that extend to idler sprockets 94 mounted on an idler shaft 96. Two scrapers 97 are secured to the chains 93 and extend across the width WSE of the screen elements 28. The chains 93, and thus the scrapers 97 on the chains 93, are continuously advanced and held in a wiper path 98 for movement relative to the screen elements 28 when the screen elements 28 are at the debris removal station 32.

Figure 9A:
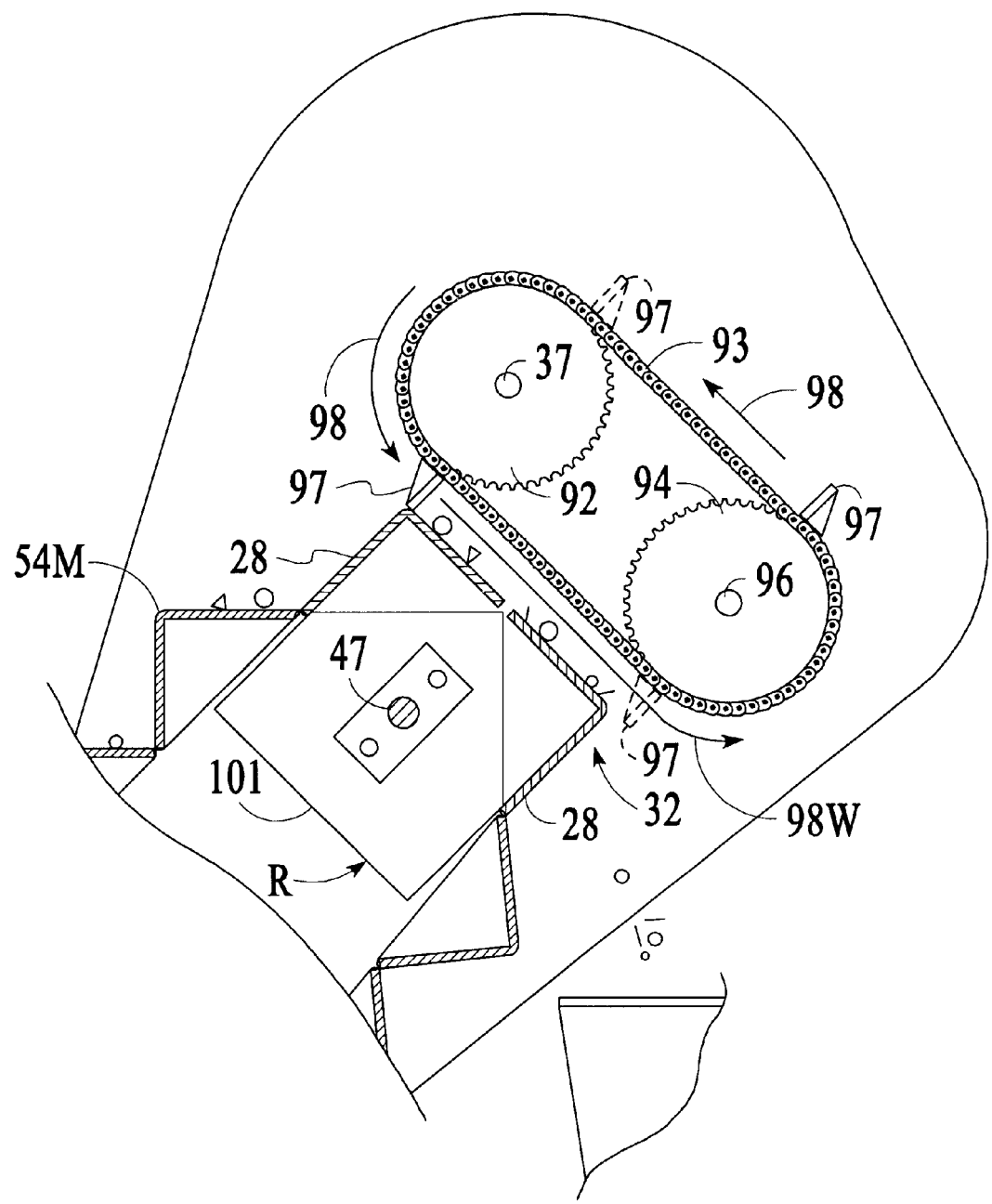
FIG. 9A is a side elevational view taken along line 9A—9A in FIG. 8 showing the continuously rotating drive shafts moving the scraper past now stationary screen elements positioned in a linear plane to facilitate being scraped.
Figure 9B:
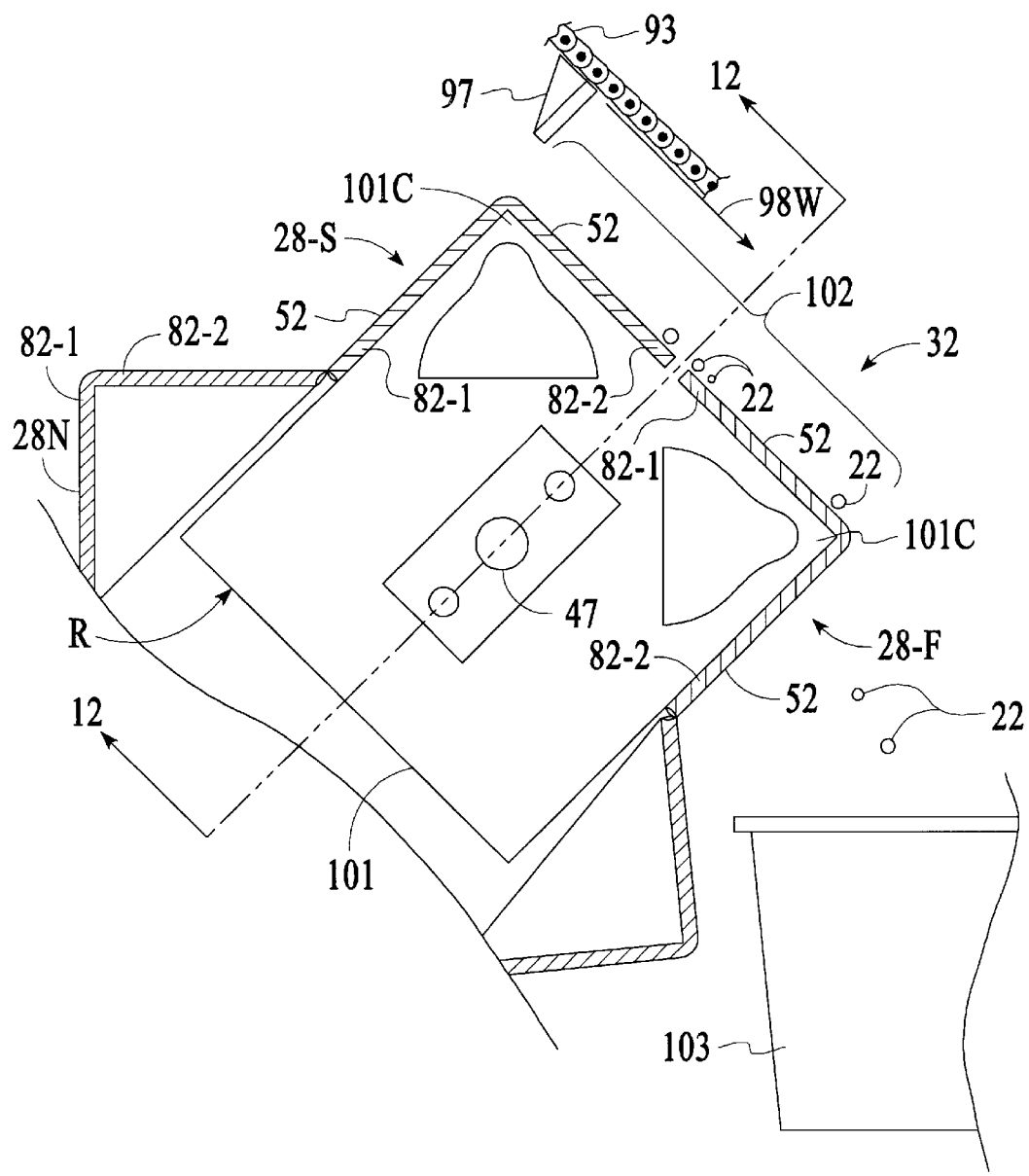
FIG. 9B is an enlarged view similar to FIG. 9A and taken along the line 9B—9B in FIG. 10 showing a square sprocket of the intermittent drive directly engaged with two adjacent ones of the screen elements to hold such elements stationary while they define a generally flat surface scraped by the scraper.
Figure 10:
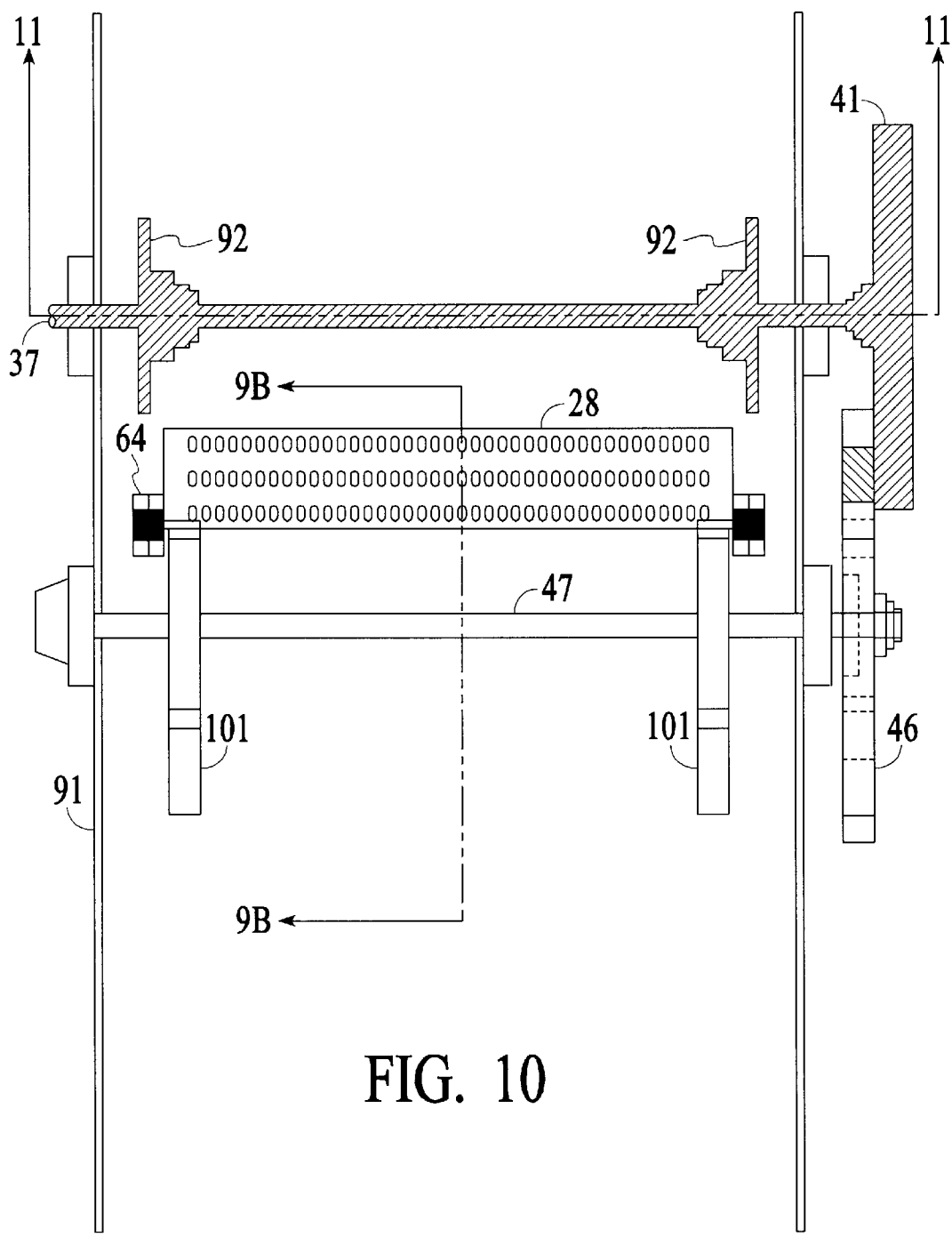
FIG. 10 is a cross sectional view taken along line 10—10 in FIG. 2A showing the main drive shaft rotating a Geneva drive plate that intermittently indexes a Geneva wheel 90 degrees to intermittently advance the screen elements.
Figure 11:
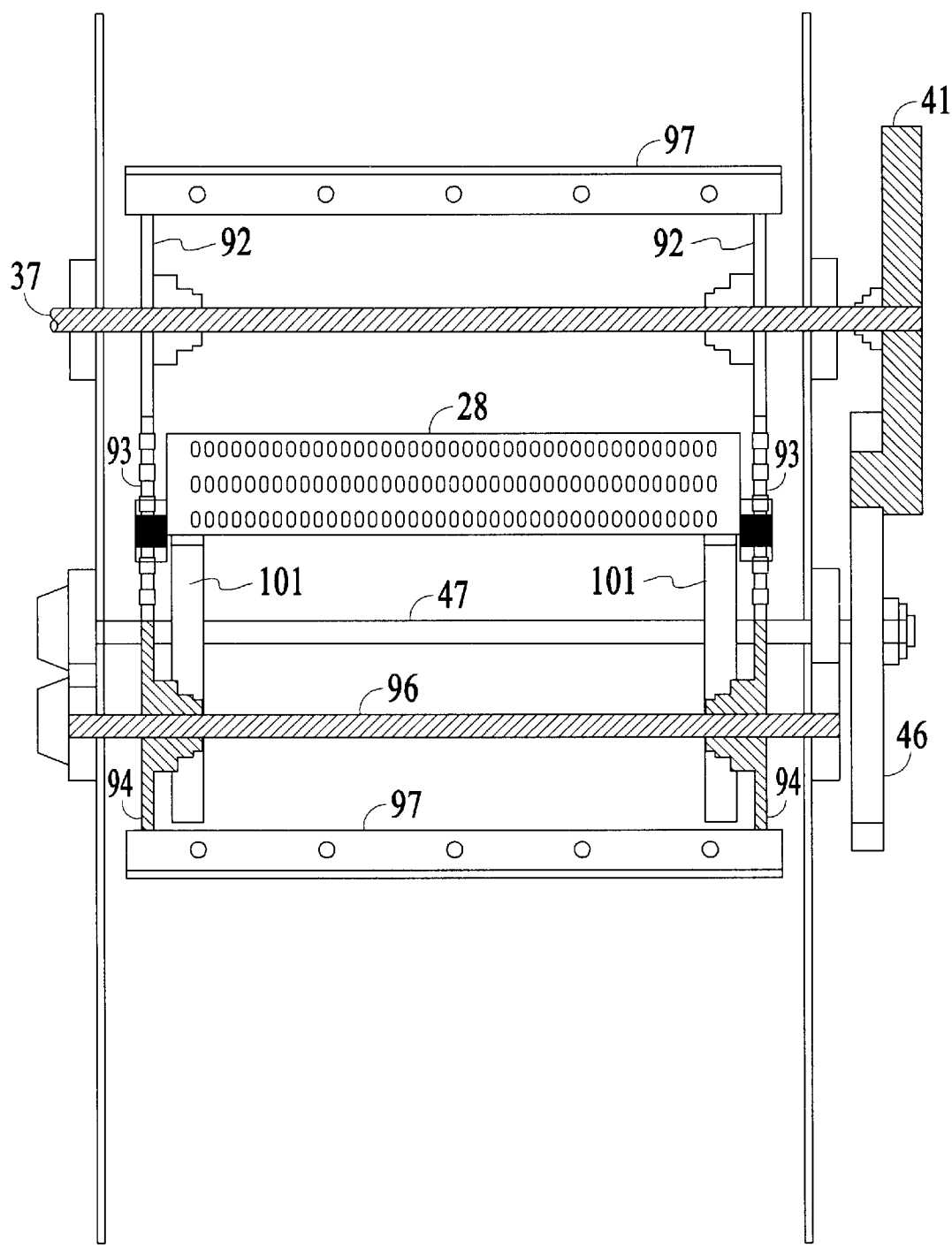
FIG. 11 is a cross sectional view taken along line 11—11 in FIG. 2A showing the main drive shaft rotating chain drive sprockets that continuously move a pair of spaced chains to drive idler sprockets, wherein the chains carry two of the scrapers.
Figure 12:
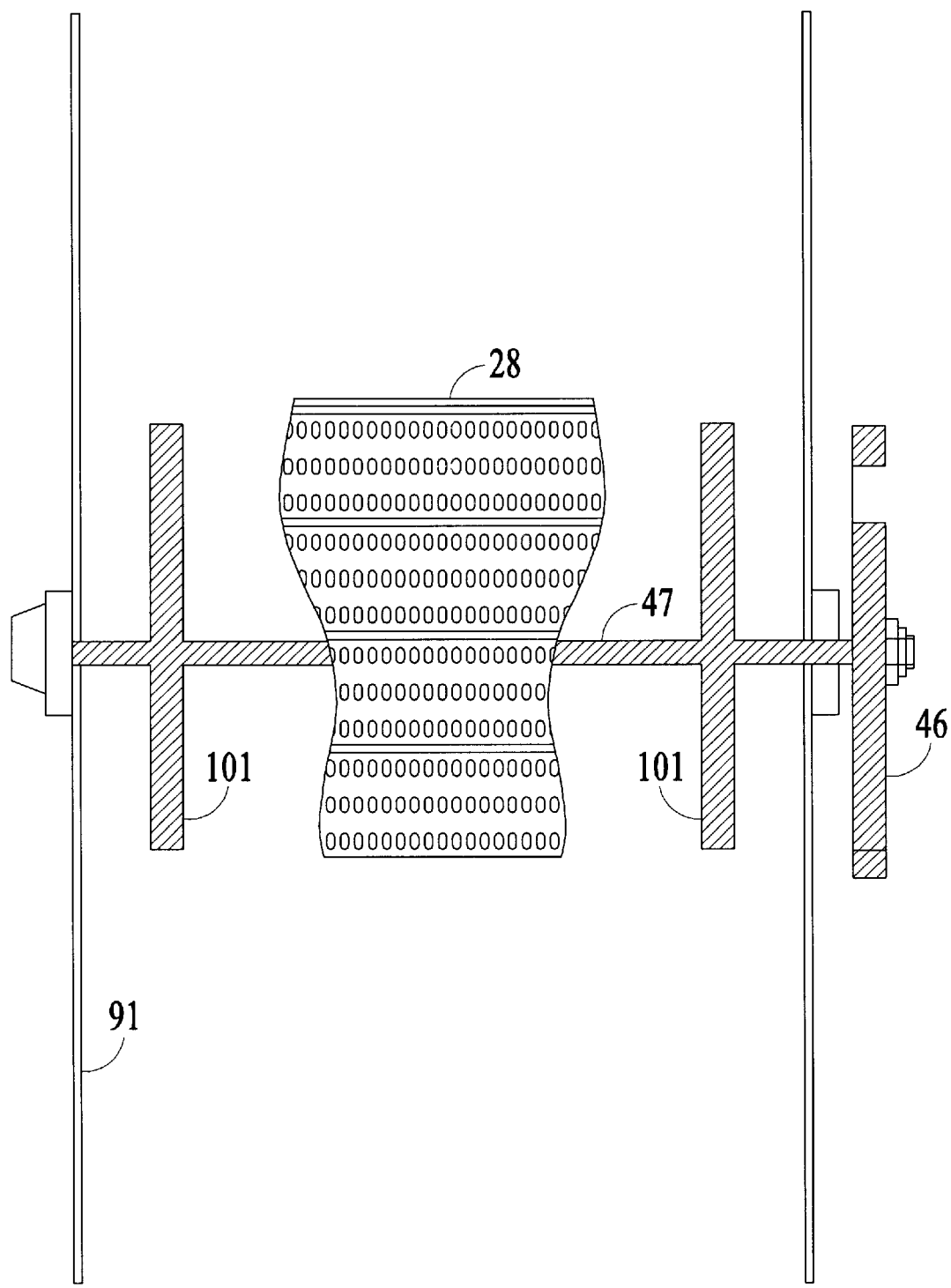
FIG. 12 is a cross sectional view taken along line 12—12 in FIG. 9B showing the intermittent drive shaft and the sprocket driven by such shaft for advancing the screen elements intermittently.

As shown in FIGS. 9A and 9B, a screen wiping subpath 98W of the wiper path 98 extends adjacent to two adjacent screen elements 28 that are at the debris removal station 32.

As shown in FIG. 9A, two adjacent screen elements 28 that are at the debris removal station 32 are in a scraping position. The Geneva wheel 46 holds the two adjacent screen elements 28 in the scraping position by holding the intermittent drive shaft 47 stationary. In turn, the shaft 47 holds a screen element drive sprocket 101 in a fixed rotary position R. The screen element drive sprocket 101 is shown in FIGS. 9A and 9B within the interior of and contacting each of the two screen elements 28 that are at the debris removal station 32. A corner 101C of the drive sprocket 101 is snug against the main apex 54M of the screen element 28. With the screen element drive sprocket 101 stationary, the screen elements 28 contacted by the screen element drive sprocket 101 are held stationary. As a result, all of the screen elements 28 are held stationary during the scraping operation. This stationary holding is referred to as a "pause", and is compared to the continuous movement of the chains 93 and of the scrapers 97.

FIG. 9B shows that during the pause, the screen element drive sprocket 101 contacts only half of each of the two contacted screen elements 28 during the pause. For descriptive purposes, with each screen element 28 having the first and second planar screening sides 82-1 and 82-2, and with the intermittent shaft having caused the sprocket 101 to have advanced the two screening elements 28 to the debris cleaning station just prior to the pause, the one screening element 28 that first arrived at the debris cleaning station is referred to as 28F, and is a leading element, whereas the other screening element 28 that second arrived at the debris cleaning station is referred to as 28S, and is a lagging element. Further, of the leading element 28F, the first screening side 82-1 is shown in FIG. 9B as leading (or ahead of) the second screening side 82-2 of the trailing, or lagging, element 28S.

Figure 14:
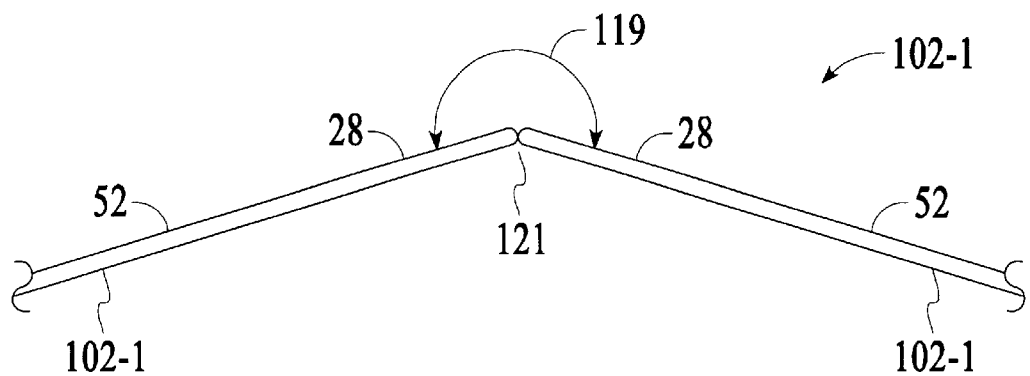
FIG. 14 is an elevational view of an alternate embodiment of the planar surface that is scraped by the scraper, where such surface has a peak.

With the two adjacent screen elements 28 at the debris removal station 32 in the scraping position, the first leading screening side 82-1 and the second trailing screening side 82-2 define a planar screen element cleaning surface 102. The surface 102 is shown in FIG. 9B as one flat plane, whereas in FIG. 14 the surface 102 is shown as having separate sections 102-1 positioned relative to each other at an obtuse angle 119 of up to five degrees more than 180 degrees. In the example of FIG. 14 the outer surface of the sprocket 101 is shaped to conform to the shape of the surface 102 as defined by the sections 102-1 at the angle 119.

As the chains 93 move in the wiper path 98W, one of the two scrapers 97 engages and wipes along the planar screen element cleaning surface 102. That is, the one of the two scrapers 97 first engages and wipes along the second trailing screening side 82-2 and then second engages and wipes along the first leading screening side 82-1. The wiping action of the scraper 97 in contact with and across the second trailing screening side 82-2 and the first leading screening side 82-1 removes the debris 22 from the planar screen element cleaning surface 102, and the debris 22 falls into a receptacle 103.

The pause then ends and the continued rotation of the wheel 41 (by the main drive shaft 37) causes the drive pin 43 to again engage one of the slots 44 provided in the Geneva wheel 46. As a result, the Geneva wheel 46 is indexed ninety degrees, and in turn rotates (or indexes) the intermittent drive shaft 47 ninety degrees. The shaft 47 then rotates the intermittent sprocket 101 ninety degrees clockwise in FIG. 9B. Recalling that the screen elements 28 are connected to each other by the endless chain 64, it may be understood that the rotation of the intermittent sprocket 101 ninety degrees urges the sprocket 101 against the screening side 82-2 of the leading element 28F. The sprocket 101 thereby causes the leading screen element 28F to move clockwise in the endless path 77 away from the sprocket 101 so that the former the second screening side 82-2 of the trailing screen element 28S becomes a next leading screen element 28F and a next screen element 28N (counterclockwise of the former lagging screen element 28S) becomes the lagging screen element 28S. The intermittent drive shaft 47 then pauses. At this time, the two adjacent screen elements 28F and 28S that are now at the debris removal station 32 are in the scraping position. With the two adjacent screen elements 28F and 28S in the scraping position, the respective first leading screening side 82-1 and the second trailing screening side 82-2 again define the next planar screen element cleaning surface 102.

Since the main drive shaft 37 has been continuously moving and rotating the sprockets 92 and 94 and the chains 93, at the time of this next pause the next scraper 97 is now positioned at the left end (as viewed in FIG. 9A) of this next planar screen element cleaning surface 102. As the next scraper 97 continues to move in the wiper path 98W, the scraper 97 engages and wipes along the planar screen element cleaning surface 102. This scraper 97 thus engages and wipes along the second trailing screening side 82-2 and then second engages and wipes along the first leading screening side 82-1. Again, the wiping action of the scraper 97 in contact with and across this next planar screen element cleaning surface 102 removes the debris 22 from this next planar screen element cleaning surface 102, and the debris 22 that was on such surface 102 falls into the receptacle 103.

In the operation of the travelling screen 21 according to the present invention, the debris 22 flows in the channel 20 with the liquid 23 and against the screen elements 28 that are in the debris collection subpath 29. These screen elements 28 block the flow of the debris 22, but allow the liquid 23 to flow through the screen element 28 toward the basin 26. The force of the liquid 23 flowing against and through these screen elements 28 tends to keep the debris 22 held against these screen elements 28. Each of these elements 28 separates the debris 22 from the flowing liquid 23, and may be said to "screen out", or "capture", the debris 22 that flows against these screen elements 28.

These screen elements 28 that were in the channel 20 are moving or stopped as they collect the debris 22 (according to the operation of the Geneva wheel 46). A cycle of operation may be said to start upon further movement of the endless chain 64. Upon such further movement, these screen elements 28 move further upwardly from the liquid 23 and out of the channel 20 to the debris removal station 32 located above the channel 20. At the time the next pause starts, the sprocket 101 has positioned and held the first leading screening side 82-1 and the second trailing screening side 82-2 in position to define the planar screen element cleaning surface 102. In the duration of the next pause, the chains 93 continue to move in the wiper path 98W so that the next one of the scrapers 97 engages and wipes along the planar screen element cleaning surface 102. The wiping action of the scraper 97 in contact with and across the second trailing screening side 82-2 and the first leading screening side 82-1 removes the debris 22 from the planar screen element cleaning surface 102, and the debris 22 falls into the receptacle 103. By this time the scraper 97 has completed a traverse of the planar screen element cleaning surface 102, and the pause ends.

When the pause ends, continued rotation of the wheel 41 (by the main drive shaft 37) causes the drive pin 43 to again engage one of the slots 44 provided in the Geneva wheel 46. The Geneva wheel 46 is indexed ninety degrees to rotate the intermittent drive shaft 47 ninety degrees. The shaft 47 rotates the intermittent sprocket 101 ninety degrees clockwise (FIG. 9B). The rotation of the intermittent sprocket 101 ninety degrees causes the next planar screen element cleaning surface 102 to be formed by the former the second screening side 82-2 of the trailing screen element 28S (which becomes the next leading screen element 28F) and by the next screen element 28N (counterclockwise of the former lagging screen element 28S) which becomes the lagging screen element 28S. Upon further movement of the endless chain 64, more of the screen elements 28 that have collected debris 22 are moved further upwardly in the liquid 23 and eventually move out of the channel 20 to the debris removal station 32 located above the channel 20, at which time another pause starts. The described cycle then repeats.

A first embodiment of a method of the present invention positions travelling screen elements 28 for separating debris 22 from the screen elements 28 after the debris 22 has been received on the screen elements 28 within the flow channel 20. Operations of the method include providing the first screen element 28 having the filter surface 51 defined by the first pair of planar plates 52, each of the plates 52 of the first pair having openings 53 through which the liquid 23 but not the debris 22 may flow. A first connector 54 between the plates 52 of the first pair positions the plates 52 of the first pair relative to each other at the angle 56 of about ninety degrees. Next, there is an operation of providing a second screen element 28 having a filter surface 51 defined by a second pair of planar plates 52, each of the plates 52 having openings 53 through which the liquid 23 but not the debris 22 may flow. A second connector 54 is between the plates 52 of the second pair for positioning the plates 52 of the second pair relative to each other at the angle 56 of about ninety degrees. Next, there is an operation of mounting the first and second screen elements 28 adjacent to each other along a portion of the endless path 77 that is out of the channel 20 so that the first screen element 28 leads the second screen element 28 along the path 77 and one planar plate 52 of the leading screen element 28 is a leading plate and the other planar plate 52 of the leading screen element 28 is a trailing plate 52 and so that one planar plate 52 of the trailing screen element 28 is a leading plate 52 and the other planar plate 52 of the trailing screen element 28 is a trailing plate 52. With the first and second screen elements 28 adjacent to each other along the path 77 out of the channel 20, a next operation is scraping the leading plate 52 of the trailing element 28 and the trailing plate 52 of the leading element 28 to separate the debris 22 from the scraped plates 52 of the screen elements 28.

An aspect of this embodiment of the method includes an operation in which the craping motion is continuous and generally parallel to the channel 20.

This embodiment may also include an operation of providing a third screen element 28 having a filter surface 51 defined by a third pair of planar plates 52, each of the plates 52 of the third pair having openings 53 through which the liquid 23 but not the debris 22 may flow. A third connector 54 is between the plates 52 of the third pair for positioning the plates 52 of the third pair relative to each other at the angle 56 of about ninety degrees. Next there is an operation of moving the first, second, and third screen elements 28 to position the third screen element 28 as a second trailing element 28 that trails the first-recited trailing screen element 28. With the second and third screen elements 28 adjacent to each other along the path 77 out of the channel 20, an operation is performed for scraping the leading plate 52 of the second trailing element 28 and scraping the trailing plate 52 of the first trailing element 28 to separate the debris 22 from the scraped plates 52 of the second and third screen elements 28.

Another embodiment of the methods of the present invention includes operations of providing a series of separate screen elements 28 and positioning pairs of the screen elements 28 adjacent to each other. There is an operation of mounting the series of elements 28 with some of the elements 28 in the channel 20 and some of the elements 28 out of the channel 20. There is an operation of collecting the debris 22 on the screen elements 28 that are in the channel 20. Then there is an operation of moving the screen elements 28 with the debris 22 out of the channel 20. There is also an operation of stopping the moving operation with one pair of the adjacent elements 28 positioned to define the planar surface 102 carrying the collected debris 22.

Further aspects of this embodiment include wherein the stopping operation is effective to cause the planar surface 102 to be one planar section. Alternatively, the stopping operation may be effective to cause the planar surface 102 to be in two planar sections 102-1, the two planar sections 102-1 defining two planes. The two planes may be at an obtuse angle 119 (e.g., 185 degrees) relative to each other and forming a peak 121.

Another aspect of this method includes operations, such that with the stopping operation positioning the one pair of the adjacent elements 28 to define the planar surface 102 carrying the collected debris 22, there is an operation of moving the scraper 97 from a start position along the planar surface 102 to scrape debris 22 off the planar surface 102. Then, after the moving of the scraper 97, an operation again moves the screen elements 28 that carry the debris 22 so that the last screen element 28 of the first pair and the first screen element 28 of a next pair of screen elements 28 define a next planar surface 102.

This embodiment of the method may further include an operation in which while again moving the screen elements 28, an operation also moves the scraper 97 to the start position. Further, the scraper 97 may be provided in the form of one or two blades on a continuous loop defined by the chain 93.

Another embodiment of the method includes an operation of providing a series of separate screen elements 28, each of the screen elements 28 having an angular cross section. Then, an operation mounts pairs of the screen elements adjacent 28 to each other. Another operation positions the series of elements 28 with some of the elements 28 in the channel 20 and relative to each other so that the angular cross sections cooperate to define a series of stairs 31 for collecting debris 22 from the channel 20. Another operation positions the series of elements 28 with some of the elements 28 out of the channel 20 and relative to each other so that the angular cross sections cooperate to change the stairs 31 to define the substantially planar surface 102 to facilitate removal of the collected debris 22 from the elements 28.

Another aspect of this embodiment intermittently performs the positioning operations so that the elements 28 pause in each respective relative position. Also, an operation operates the scraper 97 for cyclic movement across the substantially planar surface 102 to facilitate removal of the collected debris 22 from the elements 28 during one of the pauses.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of separating debris from liquid flowing in a channel, comprising the operations of:
   providing a series of separate screen elements;
   positioning pairs of the screen elements adjacent to each other;
   mounting the series of elements with some of the elements in the channel and some of the elements out of the channel;
   collecting the debris on the screen elements that are in the channel;
   moving the screen elements with the debris out of the channel;
   stopping the moving operation with one pair of the adjacent elements positioned to define a planar debris collection surface carrying the collected debris; and
   with the stopping operation positioning the one pair of the adjacent elements to define the planar debris collection surface carrying the collected debris, moving a scraper from a start position along the planar debris collection surface to scrape debris off the planar surface.

2. A method as recited in claim 1, further comprising:
   after the moving of the scraper, again moving screen elements that carry the debris so that the last screen element of the first pair and the first screen element of a next pair of screen elements define a next planar debris collection surface.

3. A method as recited in claim 2, further comprising:
   while performing the again moving operation, also moving the scraper to the start position.

4. A method as recited in claim 1, further comprising:
   providing the scraper in the form of one or two blades on a continuous loop.

5. A method as recited in claim 1, wherein the screen element moving operations move the elements in a path having a first direction, further comprising:
   the scraper moving operation being along a path in a direction generally parallel to the first direction.

6. A method of separating debris from liquid flowing in a channel, comprising the operations of:
   providing a series of separate screen elements, each of the screen elements having an angular cross section;
   mounting pairs of the screen elements adjacent to each other;
   positioning the series of elements with some of the elements in the channel and relative to each other so that the angular cross sections cooperate to define a series of stairs for collecting debris from the channel;
   positioning the series of elements with some of the elements out of the channel and relative to each other so that the angular cross sections cooperate to change the stairs to define a substantially planar surface to facilitate removal of the collected debris from the elements;
   intermittently performing the positioning operations so that the elements pause in each respective relative position; and
   operating a scraper for cyclic movement across the substantially planar surface to facilitate removal of the collected debris from the elements during one of the pauses.

7. A method according to claim 6, wherein:
   the operation of intermittently performing the positioning operations comprises:
      providing a drive pin continuously rotating relative to a drive axis; and
      providing a Geneva drive intermittently engaged and disengaged by the drive pin, the Geneva drive intermittently performing the positioning operations; and
   the drive pin continuously operates the scraper for the cyclic movement across the substantially planar surface.

8. A method of separating debris from liquid flowing in a channel, comprising the operations of:
   providing a series of separate screen elements;
   positioning pairs of the screen elements adjacent to each other;
   mounting the series of elements with some of the elements in the channel and some of the elements out of the channel;
   collecting the debris on the screen elements that are in the channel;
   moving the screen elements with the debris out of the channel; and
   stopping the moving operation with one pair of the adjacent elements positioned to define a planar debris collection surface carrying the collected debris, the stopping operation comprising:

providing a continuously rotating drive motor and a drive pin continuously rotated by the drive motor relative to a drive axis; and providing a Geneva drive intermittently engaged and disengaged by the drive pin, the disengaged Geneva drive stopping the moving operation with the one pair of the adjacent elements positioned to define the planar debris collection surface carrying the collected debris.

9. Apparatus for separating debris from liquid flowing in a channel, comprising:

a series of separate screen elements configured with pairs of the screen elements adjacent to each other and with some of the separate screen elements in the channel and with some of the elements out of the channel so that the elements in the channel collect the debris; and a screen element drive comprising a continuously operated motor, a continuously rotated Geneva pin, and a Geneva wheel intermittently driven by the pin; the driven Geneva wheel being configured to move the screen elements out of the channel and to carry the debris out of the channel, the Geneva wheel being configured to stop the moving of the screen element with one pair of the adjacent screen elements positioned out of the channel to define an intermittently-stationary planar debris collection surface carrying the collected debris.

10. Apparatus as recited in claim, further comprising:

a scraper continuously moved by the motor, the scraper being configured to cyclically move from a start position, along the intermittently-stationary planar debris collection surface to scrape debris off the intermittently-stationary planar surface, and to return to the start position.

* * * * *